US012711863B1

(12) United States Patent
Salter et al.

(10) Patent No.: US 12,711,863 B1
(45) Date of Patent: Aug. 18, 2026

(54) SYSTEMS AND METHODS FOR PATH ROUTING OF A PLURALITY OF VEHICLES

(71) Applicant: Ford Global Technologies, LLC, Dearborn, MI (US)

(72) Inventors: Stuart C. Salter, White Lake, MI (US); Krishna Bandi, Novi, MI (US); Vyas Darshan Shenoy, Canton, MI (US); Brendan Diamond, Naples, FL (US); Ryan O'Gorman, Beverly Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 19/220,789

(22) Filed: May 28, 2025

(51) Int. Cl.
*G08G 1/0968* (2006.01)
*G08G 1/0967* (2006.01)

(52) U.S. Cl.
CPC . *G08G 1/096844* (2013.01); *G08G 1/096725* (2013.01); *G08G 1/096783* (2013.01)

(58) Field of Classification Search
CPC ....... G08G 1/096844; G08G 1/096725; G08G 1/096783
See application file for complete search history.

(56) References Cited

U.S. PATENT DOCUMENTS

2005/0131643 A1* 6/2005 Shaffer ............ G08G 1/096811 701/414
2020/0124435 A1* 4/2020 Edwards ............ G01C 21/3415
2020/0125102 A1* 4/2020 Jiang ....................... G05D 1/021
2023/0145508 A1* 5/2023 Kaphengst ....... G05B 19/41805 701/24

FOREIGN PATENT DOCUMENTS

CN 113295177 8/2021
EP 3330824 6/2018
JP 7141370 9/2022

* cited by examiner

*Primary Examiner* — Donald J Wallace
(74) *Attorney, Agent, or Firm* — Burris Law, PLLC

(57) ABSTRACT

A method includes the generation of a chosen route to be followed by a plurality of vehicles based on a developed baseline route, the transmission of one or more commands instructing each vehicle of the plurality of vehicles to traverse a marshaling environment based on the chosen route, the determination of whether the traverse of each vehicle of the plurality of vehicles exceeds a tolerance-related threshold associated with the chosen route, and the initiation of a dynamic path routing process in response to determining that a traverse of a vehicle of the plurality of vehicles exceeds the tolerance-related threshold.

20 Claims, 7 Drawing Sheets

SYSTEMS AND METHODS FOR PATH ROUTING OF A PLURALITY OF VEHICLES

FIELD

The present disclosure relates to path routing of a plurality of vehicles, and more particularly, to minimizing path routing that is performed within a marshaling environment.

BACKGROUND

The statements in this section merely provide background information related to the present disclosure and may not constitute prior art.

Dynamic path planning typically provides vehicle routing paths respectively tailored for each individual vehicle. However, such an individualized means for path planning includes massive computational loads based on the number of overall vehicles that require a routing path. The massive computational load paired with an unlimited number of variables associated with vehicle features and/or functionalities presents many challenges related to dynamic path planning, in general.

The present disclosure addresses these and other issues related to the dynamic path planning of a plurality of vehicles.

SUMMARY

This section provides a general summary of the disclosure and is not a comprehensive disclosure of its full scope or all of its features.

The present disclosure provides a method comprising: generating a chosen route to be followed by a plurality of vehicles based on a developed baseline route; transmitting one or more commands instructing each vehicle of the plurality of vehicles to traverse a marshaling environment based on the chosen route; determining whether the traverse of each vehicle of the plurality of vehicles exceeds a tolerance-related threshold associated with the chosen route; and initiating a dynamic path routing process in response to determining that a traverse of a vehicle of the plurality of vehicles exceeds the tolerance-related threshold, wherein the dynamic path routing process causes the vehicle of the plurality of vehicles to return to the chosen route; further comprising: receiving an initial baseline route from at least one vehicle of the plurality of vehicles or an operator associated with the marshaling environment; observing a deviation corresponding to the traverse of each vehicle of the plurality of vehicles relative to the initial baseline route; and generating the developed baseline route based on the observed deviation; further comprising: determining an acceptable deviation from the developed baseline route based on one or more of an estimated deviation, an observed deviation, and an allowed deviation, wherein each of the estimated deviation and the observed deviation correspond to the traverse of each vehicle of the plurality of vehicles relative to the developed baseline route, and wherein the allowed deviation corresponds to a predefined maximum distance each vehicle of the plurality of vehicles is allowed to be located relative to the developed baseline route; and calculating an average deviation based on the traverse of each vehicle of the plurality of vehicles that is within the acceptable deviation from the developed baseline route, wherein generating the chosen route is based on calculating the average deviation; further comprising: monitoring the traverse of each vehicle of the plurality of vehicles across the marshaling environment, wherein whether the traverse of each vehicle of the plurality of vehicles exceeds the tolerance-related threshold is determined in response to monitoring the traverse of each vehicle of the plurality of vehicles across the marshaling environment; wherein the tolerance-related threshold corresponds to a frequency of an occurrence of a tolerance-related event, and wherein determining whether the traverse of each vehicle of the plurality of vehicles exceeds the tolerance-related threshold comprises: determining whether the frequency of the occurrence of the tolerance-related event at a location along the chosen route exceeds the tolerance-related threshold, wherein the tolerance-related event corresponds to one or more deviations including a distance of a vehicle of the plurality of vehicles from the chosen route, a radius of a turn associated with the vehicle of the plurality of vehicles from the chosen route, a speed of the vehicle of the plurality of vehicles relative to a path setting associated with the chosen route, or a combination thereof; further comprising: determining whether the frequency of the occurrence of the tolerance-related event at the location along the chosen route meets or exceeds a maximum bound of the tolerance-related threshold; and initiating the dynamic path routing process for each vehicle of the plurality of vehicles in response to determining that the frequency of the occurrence of the tolerance-related event at the location along the chosen route meets or exceeds the maximum bound of the tolerance-related threshold; and further comprising: determining one or more correction factors based on one or more configurations of each vehicle of the plurality of vehicles and a drive surface associated with the chosen route; and adjusting the one or more commands in response to determining the one or more correction factors.

The present disclosure provides a system comprising: an infrastructure system configured to: generate a chosen route to be followed by a plurality of vehicles based on a developed baseline route, transmit one or more commands instructing each vehicle of the plurality of vehicles to traverse a marshaling environment based on the chosen route, determine whether the traverse of each vehicle of the plurality of vehicles exceeds a tolerance-related threshold associated with the chosen route, and initiate a dynamic path routing process in response to determining that a traverse of a vehicle of the plurality of vehicles exceeds the tolerance-related threshold; and the vehicle of the plurality of vehicles configured to: receive the one or more commands, and return to the chosen route in response to the initiation of the dynamic path routing process; wherein the infrastructure system is further configured to: receive an initial baseline route from at least one vehicle of the plurality of vehicles or an operator associated with the marshaling environment; observe a deviation corresponding to the traverse of each vehicle of the plurality of vehicles relative to the initial baseline route; and generate the developed baseline route based on the observed deviation; wherein the infrastructure system is further configured to: determine an acceptable deviation from the developed baseline route based on one or more of an estimated deviation, an observed deviation, and an allowed deviation, wherein each of the estimated deviation and the observed deviation correspond to the traverse of each vehicle of the plurality of vehicles relative to the developed baseline route, and wherein the allowed deviation corresponds to a predefined maximum distance each vehicle of the plurality of vehicles is allowed to be located relative to the developed baseline route; and calculate an average deviation based on the traverse of each vehicle of the plurality of vehicles that is within the acceptable deviation from the developed baseline route, wherein generating the chosen route is based on calculating the average deviation; wherein the infrastructure system is further configured to: monitor the traverse of each vehicle of the plurality of vehicles across the marshaling environment, wherein whether the traverse of each vehicle of the plurality of vehicles exceeds the tolerance-related threshold is determined in response to monitoring the traverse of each vehicle of the plurality of vehicles across the marshaling environment; wherein the tolerance-related threshold corresponds to a frequency of an occurrence of a tolerance-related event, and wherein the infrastructure system configured to determine whether the traverse of each vehicle of the plurality of vehicles exceeds the tolerance-related threshold is further configured to: determine whether the frequency of the occurrence of the tolerance-related event at a location along the chosen route exceeds the tolerance-related threshold, wherein the tolerance-related event corresponds to one or more deviations including a distance of a vehicle of the plurality of vehicles from the chosen route, a radius of a turn associated with the vehicle of the plurality of vehicles from the chosen route, a speed of the vehicle of the plurality of vehicles relative to a path setting associated with the chosen route, or a combination thereof; wherein the infrastructure system is further configured to: determine whether the frequency of the occurrence of the tolerance-related event at the location along the chosen route meets or exceeds a maximum bound of the tolerance-related threshold; and initiate the dynamic path routing process for each vehicle of the plurality of vehicles in response to determining that the frequency of the occurrence of the tolerance-related event at the location along the chosen route meets or exceeds the maximum bound of the tolerance-related threshold; and wherein the infrastructure system is further configured to: determine one or more correction factors based on one or more configurations of each vehicle of the plurality of vehicles and a drive surface associated with the chosen route; and adjust the one or more commands in response to determining the one or more correction factors.

The present disclosure provides one or more non-transitory computer-readable media storing processor-executable instructions that, when executed by at least one processor, cause the at least one processor to: generate a chosen route to be followed by a plurality of vehicles based on a developed baseline route; transmit one or more commands instructing each vehicle of the plurality of vehicles to traverse a marshaling environment based on the chosen route; determine whether the traverse of each vehicle of the plurality of vehicles exceeds a tolerance-related threshold associated with the chosen route; and initiate a dynamic path routing process in response to determining that a traverse of a vehicle of the plurality of vehicles exceeds the tolerance-related threshold, wherein the dynamic path routing process causes the vehicle of the plurality of vehicles to return to the chosen route; wherein the at least one processor is further caused to: receive an initial baseline route from at least one vehicle of the plurality of vehicles or an operator associated with the marshaling environment; observe a deviation corresponding to the traverse of each vehicle of the plurality of vehicles relative to the initial baseline route; and generate the developed baseline route based on the observed deviation; wherein the at least one processor is further caused to: determine an acceptable deviation from the developed baseline route based on one or more of an estimated deviation, an observed deviation, and an allowed deviation, wherein each of the estimated deviation and the observed deviation correspond to the traverse of each vehicle of the plurality of vehicles relative to the developed baseline route, and wherein the allowed deviation corresponds to a predefined maximum distance each vehicle of the plurality of vehicles is allowed to be located relative to the developed baseline route; and calculate an average deviation based on the traverse of each vehicle of the plurality of vehicles that is within the acceptable deviation from the developed baseline route, wherein generating the chosen route is based on calculating the average deviation; wherein the tolerance-related threshold corresponds to a frequency of an occurrence of a tolerance-related event, and wherein the at least one processor caused to determine whether the traverse of each vehicle of the plurality of vehicles exceeds the tolerance-related threshold is further caused to: determine whether the frequency of the occurrence of the tolerance-related event at a location along the chosen route exceeds the tolerance-related threshold, wherein the tolerance-related event corresponds to one or more deviations including a distance of a vehicle of the plurality of vehicles from the chosen route, a radius of a turn associated with the vehicle of the plurality of vehicles from the chosen route, a speed of the vehicle of the plurality of vehicles relative to a path setting associated with the chosen route, or a combination thereof; wherein the at least one processor is further caused to: determine whether the frequency of the occurrence of the tolerance-related event at the location along the chosen route meets or exceeds a maximum bound of the tolerance-related threshold; and initiate the dynamic path routing process for each vehicle of the plurality of vehicles in response to determining that the frequency of the occurrence of the tolerance-related event at the location along the chosen route meets or exceeds the maximum bound of the tolerance-related threshold; and wherein the at least one processor is further caused to: determine one or more correction factors based on one or more configurations of each vehicle of the plurality of vehicles and a drive surface associated with the chosen route; and adjust the one or more commands in response to determining the one or more correction factors.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
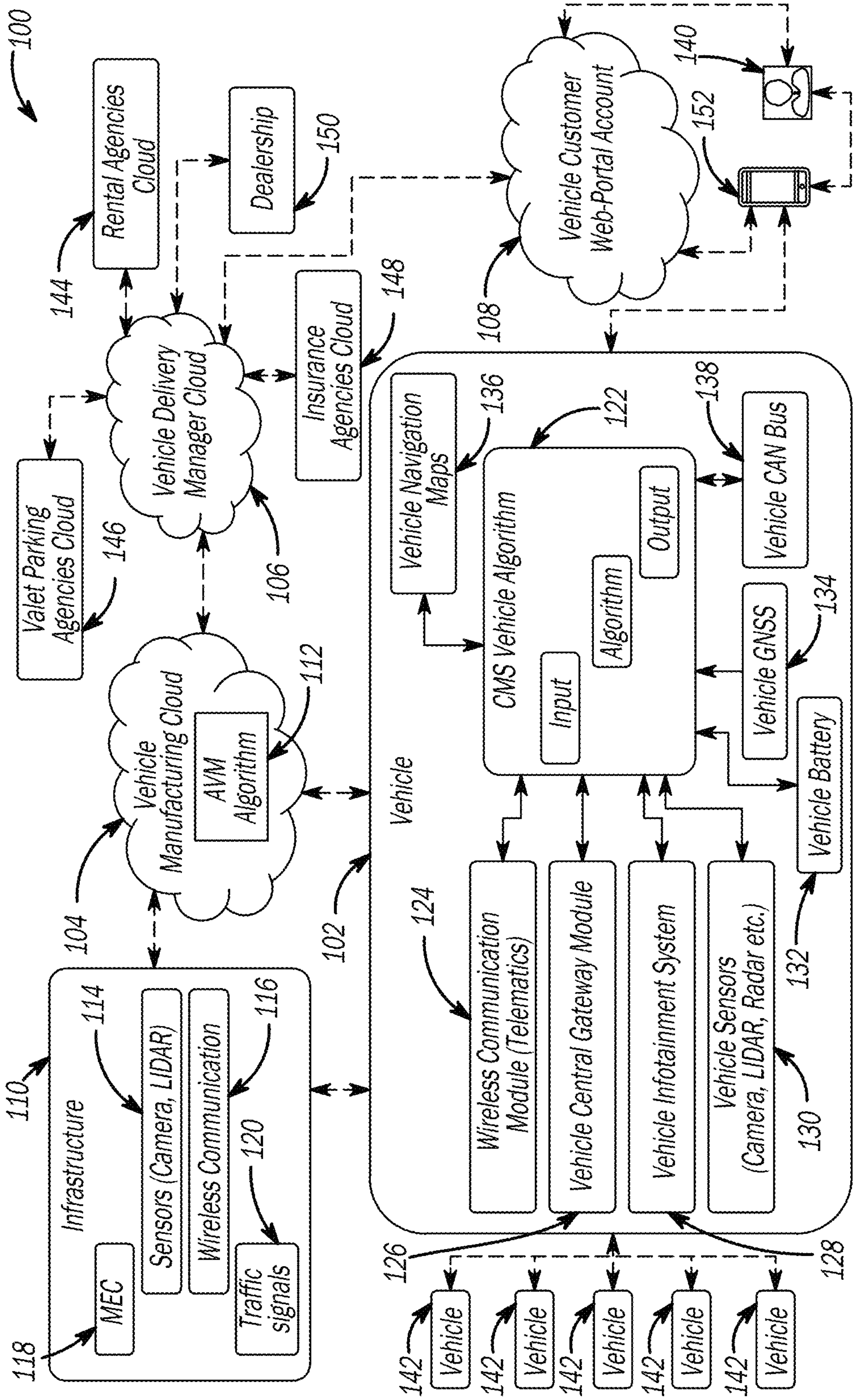
FIG. 1 illustrates a system for automated vehicle marshaling in accordance with one or more embodiments of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

One or more herein described examples provide systems and methods for minimizing dynamic path routing that is performed within a marshaling environment. In one or more examples, the minimization of dynamic path routing provides an enhanced means for guiding a plurality of vehicles through the marshaling environment without a large computational load and while providing a means for accommodating various features and/or functionalities associated with each vehicle of the plurality of vehicles.

FIG. 1 shows a schematic block diagram illustrative of an automated vehicle marshaling (AVM) system 100. In one or more examples, the AVM system 100 marshals one or more vehicles (e.g., a vehicle 102) traveling at a low speed. However, it is understood that the AVM system 100 may marshal the one or more vehicles traveling at any speed. It is also understood that the AVM system 100 may marshal semi-autonomous vehicles and/or fully autonomous vehicles.

The AVM system 100 generally includes the vehicle 102, a vehicle manufacturing cloud system 104, a vehicle delivery manager cloud system 106, a vehicle customer web-portal account cloud system 108, and an infrastructure system 110. The vehicle manufacturing cloud system 104 operates as the central cloud system that manages and/or facilitates any manufacturing process associated with the vehicle 102. The vehicle manufacturing cloud system 104 is configured to wirelessly communicate with the vehicle delivery manager cloud system 106 and/or the infrastructure system 110. The vehicle manufacturing cloud system 104 is also configured to wirelessly communicate with the vehicle 102.

The vehicle manufacturing cloud system 104 can include an infrastructure-side AVM algorithm 112. However, it is understood that the infrastructure system 110 can include the infrastructure-side AVM algorithm 112 as well, as is shown in FIG. 3. The infrastructure-side AVM algorithm 112 processes status information associated with at least the vehicle 102 of the one or more vehicles. It is understood that the infrastructure-side AVM algorithm 112 processes status information associated with each vehicle of the one or more vehicles (e.g., the vehicle 102), in one or more embodiments. The vehicle manufacturing cloud system 104 is configured to cause the infrastructure system 110 to monitor the progression of the one or more vehicles (e.g., the vehicle 102) as the vehicle(s) progress through the marshaling environment. For example, the marshaling environment can represent a plant marshaling setting, an automated charging setting, a depot marshaling setting, a parking setting, among others. As an example, the plant marshaling setting can include an instance wherein just-built vehicles are moved through end-of-line testing at a vehicle assembly plant via overhead vision sensing (e.g., via a set of infrastructure sensors 302 as shown in FIG. 3). As another example, the automated charging setting can include an instance wherein vehicles are correctly allocated to automated charging modalities located outdoor or indoor. As a further example, the depot marshaling setting can include an instance wherein a commercial fleet of vehicles are moved through warehouses and depots to load and/or process items automatically. As an additional example, the parking setting can include an instance wherein vehicles are moved through underground or covered parking environments with a potentially inconsistent communication network such as a global navigation satellite system.

The vehicle manufacturing cloud system 104 is also configured to cause the infrastructure system 110 to communicate with the one or more vehicles. For example, the vehicle manufacturing cloud system 104 utilizes the infrastructure-side AVM algorithm 112 to send instructions to the infrastructure system 110 and/or to process information received from the infrastructure system 110. The vehicle manufacturing cloud system 104 is also configured to cause the vehicle delivery manager cloud system 106 to facilitate a delivery of the one or more vehicles (e.g., the vehicle 102) to various locations. For example, the vehicle manufacturing cloud system 104 utilizes the infrastructure-side AVM algorithm 112 to send instructions to the vehicle delivery manager cloud system 106 and/or to process information received from the vehicle delivery manager cloud system 106.

The vehicle manufacturing cloud system 104 is further configured to communicate directly with the one or more vehicles to cause the one or more vehicles to start, stop, or pause progression through the marshaling environment. The vehicle manufacturing cloud system 104 is also configured to control a marshaling speed of the one or more vehicles as the one or more vehicles travel through (e.g., traverse) the marshaling environment. For example, the vehicle manufacturing cloud system 104 utilizes the infrastructure-side AVM algorithm 112 to send instructions to the vehicle 102 and/or to process information received from the vehicle 102.

The infrastructure system 110 includes a sensor component 114, a wireless communication component 116, a multi-access edge computing (MEC) system 118, and one or more traffic signals 120. It is understood that the MEC system 118 is configured to support communication between the wireless communication component 116 and the vehicle 102. It is further understood, however, that the MEC system 118 is also configured to support communication between the wireless communication component 116 and any of the vehicle manufacturing cloud system 104, the vehicle delivery manager cloud system 106, and/or the vehicle customer web-portal account cloud system 108. For example, the wireless communication component 116 may utilize GPS, Wi-Fi, satellite, 3G/4G/5G, and/or Bluetooth® to communicate with the one or more vehicles.

The wireless communication component 116 also communicates with the sensor component 114 that is configured to communicate with and/or manage the set of infrastructure sensors 302, as is described herein. In one or more examples, the sensor component 114 is also configured to perform one or more localization functions associated with marshaling the one or more vehicles such as, but not limited to, perception, path-planning, detection, controls, and/or receiving and analyzing response(s) from each vehicle of the one or more vehicles.

The wireless communication component 116 is also in communication with the traffic signals 120. For example, the wireless communication component 116 may cause the traffic signals 120 to direct traffic of the one or more vehicles as the one or more vehicles are marshaled through the marshaling environment. It is understood that the infrastructure system 110 can forward instructions received from the vehicle manufacturing cloud system 104 to the vehicle 102. However, it is also understood that the infrastructure system 110 can send instructions to the vehicle 102 directly through the utilization of the MEC system 118, for example.

The vehicle 102 includes a vehicle-side AVM algorithm 122, a wireless transmission module 124, a vehicle central gateway module 126, a vehicle infotainment system 128, one or more vehicle sensors 130, a vehicle battery 132, a vehicle GNSS 134, a vehicle navigation mapping system 136, and a controller area network (CAN) vehicle bus 138. The wireless transmission module 124 may be a transmission control unit (TCU) and/or may be supported by telematically supported subsystems. The wireless transmission module 124 includes one or more sensors that are configured to gather data and send signals to other components of the vehicle 102. The one or more sensors of the wireless transmission module 124 may include, but is not limited to, a vehicle speed sensor (not shown) configured to determine a current speed of the vehicle 102; a wheel speed sensor (not shown) configured to determine if the vehicle 102 is traveling at an incline or a decline; a throttle position sensor (not shown) configured to determine if a downshift or upshift of one or more gears associated with the vehicle 102 is required in a current status of the vehicle 102; and/or a turbine speed sensor (not shown) configured to send data associated with a rotational speed of a torque converter of the vehicle 102.

The wireless transmission module 124 communicates information, gathered by the one or more sensors, to the vehicle-side AVM algorithm 122. In one embodiment, the vehicle-side AVM algorithm 122 may be disposed as a component within the wireless transmission module 124. For example, the vehicle 102 utilizes the vehicle-side AVM algorithm 122 to process and send information gathered by the one or more sensors to the infrastructure system 110. As another example, the vehicle 102 utilizes the vehicle-side AVM algorithm 122 to process and send information gathered by the one or more sensors to the vehicle manufacturing cloud system 104 directly. The vehicle-side AVM algorithm 122 is configured to communicate information and/or instructions to the wireless transmission module 124 received from the infrastructure system 110 and/or the vehicle manufacturing cloud system 104.

The vehicle central gateway module 126 operates as an interface between various vehicle domain bus systems, such as an engine compartment bus (not shown), an interior bus (not shown), an optical bus for multimedia (not shown), a diagnostic bus for maintenance (not shown), or the vehicle CAN bus 138. The vehicle central gateway module 126 is configured to distribute data communicated to the vehicle central gateway module 126 by each of the various domain bus systems to other components of the vehicle 102. The vehicle central gateway module 126 is also configured to distribute information received from the vehicle-side AVM algorithm 122 to the various domain bus systems. The vehicle central gateway module 126 is further configured to send information to the vehicle-side AVM algorithm 122 received from the various domain bus systems. For example, the vehicle 102 utilizes the vehicle-side AVM algorithm 122 to process and send information received from the vehicle central gateway module 126 to the infrastructure system 110. As another example, the vehicle 102 utilizes the vehicle-side AVM algorithm 122 to process and send information received from the vehicle central gateway module 126 to the vehicle manufacturing cloud system 104 directly. The vehicle-side AVM algorithm 122 is configured to communicate information and/or instructions to the vehicle central gateway module 126 received from the infrastructure system 110 and/or the vehicle manufacturing cloud system 104.

The vehicle infotainment system 128 delivers a combination of information and entertainment content and/or services to a user 140 of the vehicle 102. It is understood that the vehicle infotainment system 128 can deliver only entertainment content to the user 140 of the vehicle 102, in some examples. It is also understood that the vehicle infotainment system 128 can deliver information services to anyone associated with the vehicle 102, in other examples. As an example, the vehicle infotainment system 128 includes built-in car computers that combine one or more functions, such as digital radios, built-in cameras, and/or televisions. The vehicle infotainment system 128 communicates information associated with the built-in car computers or processors to the vehicle-side AVM algorithm 122. For example, the vehicle 102 utilizes the vehicle-side AVM algorithm 122 to process and send information received from the vehicle infotainment system 128 to the infrastructure system 110. As another example, the vehicle 102 utilizes the vehicle-side AVM algorithm 122 to process and send information received from the vehicle infotainment system 128 to the vehicle manufacturing cloud system 104 directly. The vehicle-side AVM algorithm 122 is configured to communicate information and/or instructions to the vehicle infotainment system 128 received from the infrastructure system 110 and/or the vehicle manufacturing cloud system 104.

The one or more vehicle sensors 130 may be, for example, one or more of cameras, lidar, radar, and/or ultrasonic devices. For example, ultrasonic devices utilized as the one or more vehicle sensors 130 emit a high frequency sound wave that hits a wall or another vehicle and is then reflected back to the vehicle 102. Based on the amount of time it takes for the sound wave to return to the vehicle 102, the vehicle 102 can determine the distance between the one or more vehicle sensors 130 and the wall or the other vehicle. As another example, camera devices utilized as the one or more vehicle sensors 130 provide a visual indication of a space around the vehicle 102. As an additional example, radar devices utilized as the one or more vehicle sensors 130 emit electromagnetic wave signals that hit the wall or the other vehicle and is then reflected back to the vehicle 102. Based on the amount of time it takes for the electromagnetic waves to return to the vehicle 102, the vehicle 102 can determine a range, velocity, and angle of the vehicle 102 relative to the wall or the other vehicle.

The one or more vehicle sensors 130 communicate information associated with the position and/or distance at which the vehicle 102 is located relative to the wall or the other vehicle to the vehicle-side AVM algorithm 122. For example, the vehicle 102 utilizes the vehicle-side AVM algorithm 122 to process and send information received from the one or more vehicle sensors 130 to the infrastructure system 110. As another example, the vehicle 102 utilizes the vehicle-side AVM algorithm 122 to process and send information received from the one or more vehicle sensors 130 to the vehicle manufacturing cloud system 104 directly. The vehicle-side AVM algorithm 122 is configured to communicate information and/or instructions to the one or more vehicle sensors 130 received from the infrastructure system 110 and/or the vehicle manufacturing cloud system 104.

The vehicle battery 132 is controlled by a battery management system (not shown) that provides instructions to the vehicle battery 132. For example, the battery management system provides instructions to the vehicle battery 132 based on a temperature of the vehicle battery 132. However, it is understood that the battery management system may provide instructions to the vehicle battery 132 based on any measure associated with the vehicle battery 132 such as power state of the vehicle 102, a time period that the vehicle 102 is in an off-state, or a combination thereof. The battery management system ensures acceptable current modes of the vehicle battery 132. For example, the acceptable current modes protect against overvoltage, overcharge, and/or overheating of the vehicle battery 132. As another example, the temperature of the vehicle battery 132 indicates to the battery management system whether any of the acceptable current modes are within acceptable temperate ranges. The battery management system associated with the vehicle battery 132 communicates information associated with the temperature of the vehicle battery 132 to the vehicle-side AVM algorithm 122. For example, the vehicle 102 utilizes the vehicle-side AVM algorithm 122 to process and send information received regarding the vehicle battery 132 to the infrastructure system 110. As another example, the vehicle 102 utilizes the vehicle-side AVM algorithm 122 to process and send information regarding the vehicle battery 132 to the vehicle manufacturing cloud system 104 directly. The vehicle-side AVM algorithm 122 is configured to communicate information and/or instructions to the vehicle battery 132 received from the infrastructure system 110 and/or the vehicle manufacturing cloud system 104.

The vehicle GNSS 134 is configured to communicate with satellites so that the vehicle 102 can determine a specific location of the vehicle 102. The vehicle navigation mapping system 136 can display, via a display screen (not shown), the specific location of the vehicle 102 to the user 140. The vehicle GNSS 134 communicates geographical information associated with the vehicle 102 to the vehicle-side AVM algorithm 122. For example, the vehicle 102 utilizes the vehicle-side AVM algorithm 122 to process and send information received from the vehicle GNSS 134 to the infrastructure system 110. As another example, the vehicle 102 utilizes the vehicle-side AVM algorithm 122 to process and send information from the vehicle GNSS 134 to the vehicle manufacturing cloud system 104 directly. The vehicle-side AVM algorithm 122 is configured to communicate information and/or instructions to the vehicle GNSS 134 received from the infrastructure system 110 and/or the vehicle manufacturing cloud system 104. As another example, the vehicle 102 utilizes the vehicle-side AVM algorithm 122 to process and send information associated with the vehicle navigation mapping system 136 to the infrastructure system 110. As another example, the vehicle 102 utilizes the vehicle-side AVM algorithm 122 to process and send information from the vehicle navigation mapping system 136 to the vehicle manufacturing cloud system 104 directly. The vehicle-side AVM algorithm 122 is configured to communicate information and/or instructions to the vehicle navigation mapping system 136 received from the infrastructure system 110 and/or the vehicle manufacturing cloud system 104.

The vehicle 102 is configured to communicate any information associated with any of the components included within the vehicle 102 to one or more additional vehicles 142. The vehicle 102 is also configured to communicate (e.g., forward) any instructions received from the infrastructure system 110 and/or the vehicle manufacturing cloud system 104 to any of the one or more additional vehicles 142. For example, the communication of the vehicle 102 with the one or more additional vehicles 142 can aid the infrastructure system 110 and/or the vehicle manufacturing cloud system 104 in marshaling the one or more additional vehicles 142. It is understood that each of the one or more additional vehicles 142 can include any of the components described as being included within the vehicle 102, such as, but not limited to, the vehicle-side AVM algorithm 122, the wireless transmission module 124, the vehicle central gateway module 126, the vehicle infotainment system 128, the one or more vehicle sensors 130, the vehicle battery 132, the vehicle GNSS 134, the vehicle navigation mapping system 136, and/or the CAN vehicle bus 138, for example. It is also understood that any of the one or more additional vehicles 142 is configured to communicate information associated with any of the components included therein with the vehicle 102. It is further understood that the one or more additional vehicles 142 can also be configured to establish a direct line of wireless communication (e.g., via a communication link) with the infrastructure system 110 and/or the vehicle manufacturing cloud system 104, whereby information can be directly exchanged between the one or more additional vehicles 142 and the infrastructure system 110 and/or the vehicle manufacturing cloud system 104.

The vehicle delivery manager cloud system 106 wirelessly communicates (e.g., receives and/or sends instructions and/or information) with one or more of a rental agency cloud system 144, a valet parking agency cloud system 146, an insurance agency cloud system 148, and/or a dealership system 150. The vehicle delivery manager cloud system 106 is configured to facilitate the delivery of the one or more vehicles to, for example, any of a rental agency (not shown) associated with the rental agency cloud system 144, a valet parking agency (not shown) associated with the valet parking agency cloud system 146, an insurance agency (not shown) associated with the insurance agency cloud system 148, and/or the dealership system 150. The vehicle delivery manager cloud system 106 also wirelessly communicates with the vehicle customer web-portal account cloud system 108. It should be understood that other cloud systems can be included, in one or more examples.

The vehicle delivery manager cloud system 106 wirelessly communicates with a user device 152 such as, but not limited to, a mobile device, a display panel, and/or a computer. The vehicle 102 is also configured to wirelessly communicate directly with the user device 152. For example, the user 140 engages with the user device 152 via an application that organizes any information and/or instructions received from the vehicle customer web-portal account cloud system 108 and/or the vehicle 102. As another example, the user 140 may send one or more instructions to the vehicle customer web-portal account cloud system 108 such as making a selection of which vehicle the user 140 would like to receive from any of the rental agency associated with the rental agency cloud system 144, the valet parking agency associated with the valet parking agency cloud system 146, the insurance agency associated with the insurance agency cloud system 148, and/or the dealership system 150.

Figure 2:
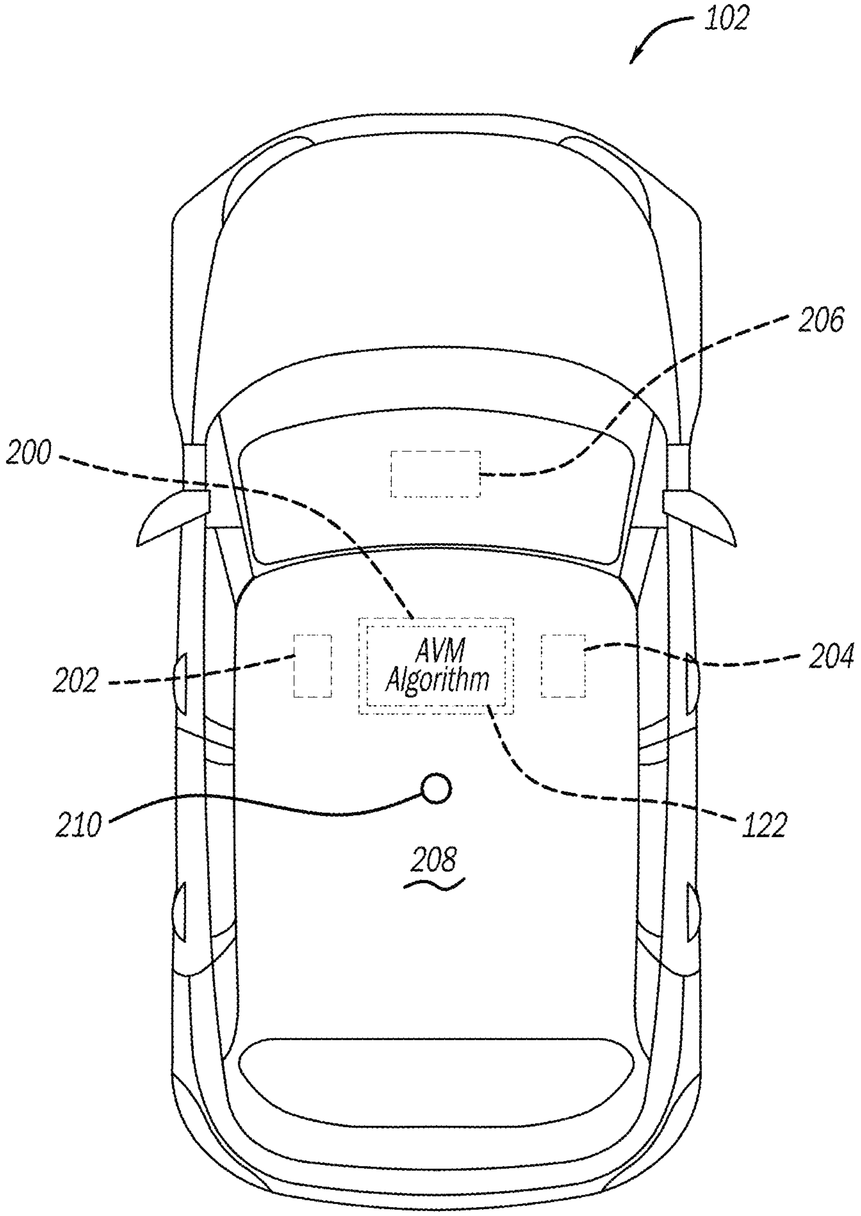
FIG. 2 illustrates an example vehicle marshaled by the system shown in FIG. 1 in accordance with one or more embodiments of the present disclosure.

Referring to FIG. 2, in various forms, the vehicle(s) 102 may be powered in a variety of ways, for example, with an electric motor and/or an internal combustion engine. It is understood that the vehicle(s) 102 may be any type of vehicle powered by an electric motor and/or an internal combustion engine such as a car, a truck, a robot, a plane, and/or a boat. The vehicle(s) 102 generally includes a vehicle controller 200, one or more actuators 202, a plurality of on-board sensors 204, a human machine interface (HMI) 206, and a vehicle system 208. The vehicle(s) 102 also has a reference point 210, that is, a specified point within a space defined by a vehicle body that identifies the location of the vehicle(s) 102. For example, the reference point 210 is a geometrical center point at which respective longitudinal and lateral center axes of the vehicle(s) 102 intersects. As another example, the reference point 210 is a point at which the vehicle(s) 102 is located as the vehicle(s) 102 navigates toward a waypoint.

The plurality of on-board sensors 204 includes a variety of devices to provide data to the vehicle controller 200. For example, the plurality of on-board sensors 204 may include object detection sensors (e.g., lidar sensor(s)) disposed on or in the vehicle(s) 102 that provide relative locations, sizes, and/or shapes of one or more objects surrounding the vehicle(s) 102, such as additional vehicles, bicycles, robots, drones, etc., travelling next to, ahead, and/or behind the vehicle(s) 102. As another example, one or more of the plurality of on-board sensors 204 can be radar sensor(s) affixed to one or more bumpers of the vehicle(s) 102 that may provide locations of the object(s) relative to the location of each of the vehicle(s) 102. As yet another example, one or more of the plurality of on-board sensors 204 can be configured to monitor one or more functionalities associated with one or more internally-based components of the vehicle (s) 102.

The plurality of on-board sensors 204 may include a camera sensor, for example, to provide a front view, side view, rear view, etc., providing images from an area surrounding the vehicle(s) 102. As another example, the vehicle controller 200 may be programmed to receive sensor data from a camera sensor(s) and to implement image processing techniques to detect a road, infrastructure elements, etc. The vehicle controller 200 may be programmed to determine a current vehicle location based on location coordinates (e.g., GPS coordinates) received from the vehicle(s) 102 indicative of a location of the vehicle(s) 102 from a GPS sensor (not shown).

The vehicle controller 200, in some examples, is configured or programmed to control the operation of one or more of vehicle brakes, propulsion (e.g., control of acceleration in the vehicle(s) 102 by controlling one or more of an internal combustion engine, electric motor, hybrid engine, etc.), steering, climate control, interior and/or exterior lights, etc. The vehicle controller 200, in other examples, is further configured or programmed to determine whether and when the vehicle controller 200, as opposed to a human operator, is to control such operations related to the vehicle(s) 102. It is understood that any of the operations associated with the vehicle(s) 102 may be facilitated via an automated, a semi-automated, or a manual mode. For example, the automated mode may facilitate any of the operations to be fully controlled by the vehicle controller 200 without the aid of the human operator. As another example, the semi-automated mode may facilitate any of the operations to be at least partially controlled by the human operator in combination with the vehicle controller 200. As a further example, the manual mode may facilitate the operations to be fully controlled by the human operator without the aid of the vehicle controller 200.

The vehicle controller 200 includes, or may be communicatively coupled to (e.g., via a vehicle communications bus), one or more processors (not shown). For example, the one or more processors can be a controller, or the like, included in the vehicle(s) 102 for monitoring and/or controlling various vehicle controllers, such as a powertrain controller, a brake controller, a steering controller, etc. The vehicle controller 200 is generally arranged for various communications on a vehicle communication network (not shown) that can include a bus in the vehicle(s) 102 such as a CAN bus, or the like, and/or other wired and/or wireless mechanisms.

Via a vehicle network, the vehicle controller 200 transmits messages to various devices in the vehicle(s) 102 and/or receives messages from the various devices, for example, the one or more actuators 202, the HMI 206, etc. Alternatively, or additionally, in cases where the vehicle controller 200 includes multiple devices, the vehicle communication network is utilized for communications between devices represented as the vehicle controller 200 in this disclosure. Further, as is discussed below, various other controllers and/or sensors provide data to the vehicle controller 200 via the vehicle communication network.

In addition, the vehicle controller 200, via the vehicle-side AVM algorithm 122, is also configured to communicate through a vehicle-to-infrastructure communication network, such as communicating with an infrastructure controller (e.g., an infrastructure controller 304 as shown in FIG. 3). The vehicle controller 200, via the vehicle-side AVM algorithm 122, is also configured for communicating through a wireless vehicular communication interface with other traffic objects (e.g., vehicles, infrastructures, etc.), such as, via a vehicle-to-vehicle communication network. The vehicular communication network represents one or more mechanisms by which the vehicle controller 200 of the vehicle(s) 102 communicates with other traffic objects. As an example, the vehicular communication network may be one or more of wireless communication mechanisms, including any desired combination of wireless (e.g., cellular, wireless, satellite, microwave, and/or radio frequency) communication mechanisms and any desired network topology (or topologies when multiple communication mechanisms are utilized). Examples of vehicular communication networks include, among others, cellular, Bluetooth®, IEEE 802.11, dedicated short range communications (DSRC), and/or wide area networks (WAN), including the Internet, providing data communication services.

The one or more actuators 202 are implemented via circuits, chips, or other electronic and/or mechanical components that can actuate various vehicle subsystems in accordance with appropriate control signals. The one or more actuators 202 may be used to control braking, acceleration, and/or steering of the vehicle(s) 102. The vehicle controller 200 can be programmed to activate the one or more actuators 202 including propulsion, steering, and/or braking based on the planned acceleration or deceleration of the vehicle(s) 102.

The HMI 206 is configured to receive Information from the human operator during operation of the vehicle(s) 102. Moreover, the HMI 206 is configured to present information to the human operator, such as an occupant of the vehicle(s) 102. In some variations, the vehicle controller 200 is programmed to receive destination data (e.g., location coordinates) from the HMI 206.

The vehicle system 208 is configured to control each of the subsystems within the vehicle(s) 102 and facilitate requests across each of the above-described components (e.g., the vehicle controller 200, the one or more actuators 202, the plurality of on-board sensors 204, and/or the HMI 206). Accordingly, the vehicle(s) 102 can be autonomously guided toward a waypoint using at least the plurality of on-board sensors 204. Routing can be performed using vehicle location, distance to travel, queue in line for vehicle marshaling, etc.

Figure 3A:
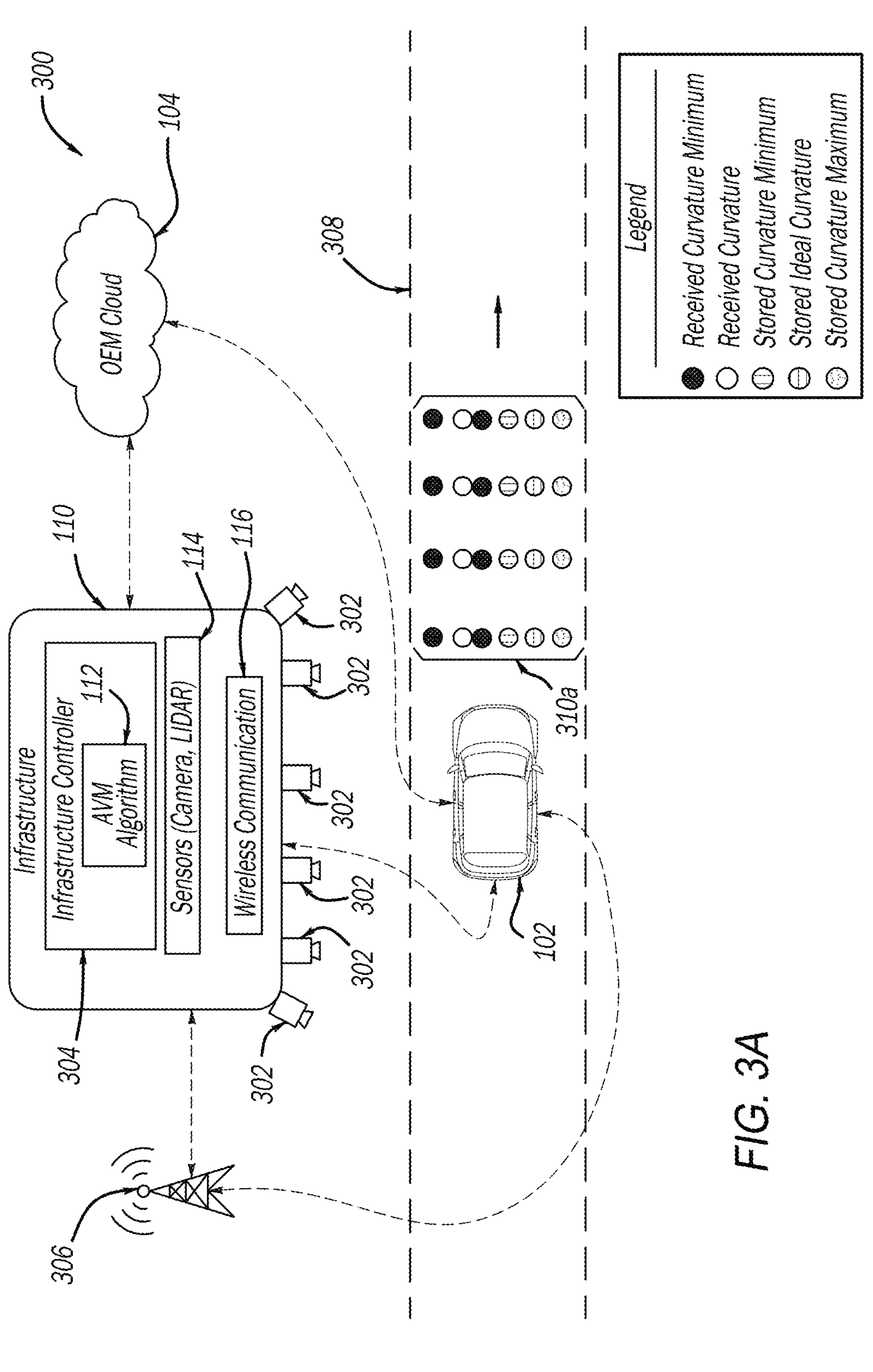
FIGS. 3A and 3B illustrate an implementation of a system for minimizing dynamic path routing within a marshaling environment in accordance with one or more embodiments of the present disclosure.
Figure 3B:
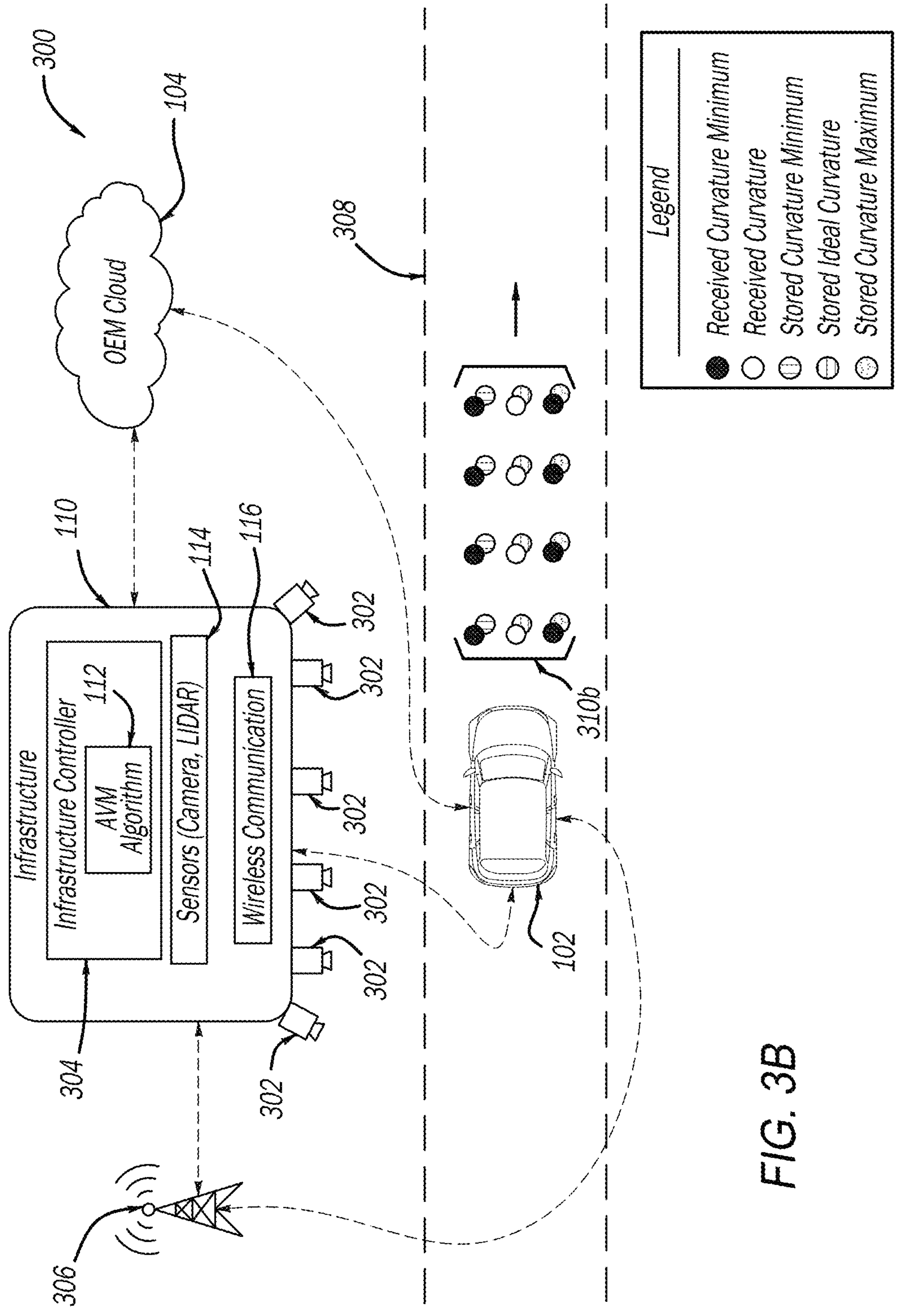

In one or more embodiments, FIGS. 3A and 3B show a system 300 that is an example embodiment of the AVM system 100 depicted in FIG. 1. More specifically, FIGS. 3A and 3B illustrate the system 300 that is configured to provide a means for minimizing dynamic path routing relative to the traverse of a plurality of vehicles (e.g., the vehicle 102 and the one or more additional vehicles 142) through the marshaling environment. The system 300 includes the infrastructure system 110. The infrastructure system 110 includes the sensor component 114 that communicates with the set of infrastructure sensors 302. The set of infrastructure sensors 302 are configured to monitor the movement (e.g., the traverse) of each vehicle of the plurality of vehicles as the plurality of vehicles move through the marshaling environment. The infrastructure system 110 also includes the wireless communication component 116 that provides a means for communication between the infrastructure system 110 and at least one communication node 306 as well as the vehicle manufacturing cloud system 104. However, it is understood that the wireless communication component 116 also provides a means for direct communication between the infrastructure system 110 and each vehicle of the plurality of vehicles.

In one or more examples, movement of each vehicle of the plurality of vehicles is monitored based on a field of view of the set of infrastructure sensors 302. As another example, movement of each vehicle of the plurality of vehicles through a geofenced area (e.g., a geofenced area 308 area as shown in FIG. 3) the manufacturing environment is also monitored based on one or more infrastructure marshaling messages (e.g., IMMs) and one or more vehicle marshaling messages (e.g., VMMs) exchanged between any of the vehicles of the plurality of vehicles and the infrastructure system 110.

Additionally, the infrastructure system 110 includes the infrastructure controller 304. The infrastructure controller 304 is configured to centrally control an operation of each vehicle of the plurality of vehicles. For example, the operation of each vehicle of the plurality of vehicles includes, but is not limited to, propulsion, braking, and/or steering of each vehicle of the plurality of vehicles. It is understood that the infrastructure controller 304 may be disposed within the infrastructure system 110 or externally located relative to the infrastructure system 110. The infrastructure controller 304 includes the infrastructure-side AVM algorithm 112 that is configured to facilitate communication between the infrastructure controller 304 and the vehicle controller 200 associated with each vehicle of the plurality of vehicles.

Figure 4:
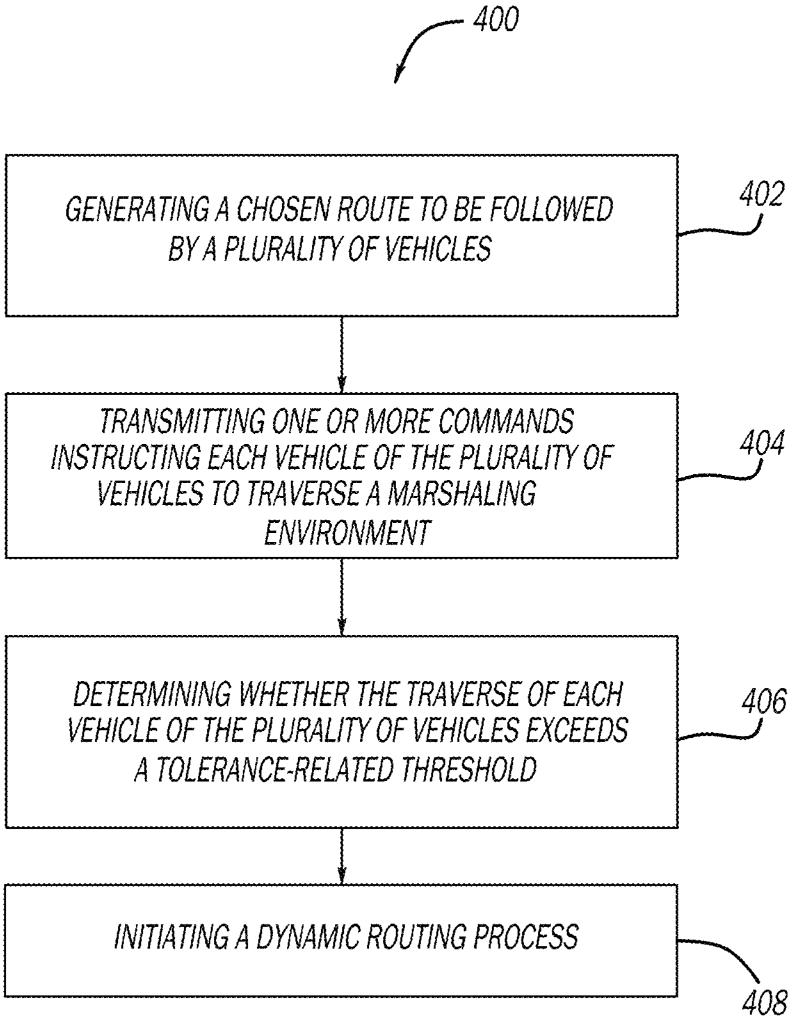
FIG. 4 is a flowchart illustrating an example method for minimizing dynamic path routing within a marshaling environment in accordance with one or more embodiments of the present disclosure.

FIG. 4 is a flowchart illustrating an example method 400 for minimizing dynamic path routing that is performed within a marshaling environment, as is described herein. In one or more examples, and as is described herein, the method 400 corresponds to a system configured to utilize dynamic path planning (e.g., a dynamic path planning process) to generate a chosen route as well as monitor a plurality of vehicles (e.g., the vehicle 102 and/or the one or more additional vehicles 142) as the plurality of vehicles traverse the marshaling environment following the chosen route. In one or more examples, the chosen route is provided to each vehicle of the plurality of vehicles rather than providing an individualized pathway for each vehicle of the plurality of vehicles to independently follow. As another example, the dynamic path planning process reactively provides individualized adjustments to the traverse of particular vehicles of the plurality of vehicles that may deviate from the chosen route, as is described herein.

At operation 402, an infrastructure system (e.g., the infrastructure system 110) is configured to generate the chosen route to be followed by the plurality of vehicles. In one or more examples, the chosen route to be followed by the plurality of vehicles is generated based on a developed baseline route. As another example, one or more variations of the chosen route may be built into the chosen route based on one or more vehicle configurations. It is understood that one or more vehicles of the plurality of vehicles with one or more features corresponding to a variation of the chosen route may traverse the chosen route based on one or more parameters that may differ from the chosen route without exceeding a tolerance-related threshold associated with the chosen route.

In one or more embodiments, the infrastructure system is configured to receive an initial baseline route from at least one vehicle of the plurality of vehicles. However, it is understood that the infrastructure system is configured to receive the initial baseline route from any being and/or entity associated with the marshaling environment such as, but not limited to, a human operator (e.g., the user 140). The infrastructure system is also configured to observe (e.g., via the set of infrastructure sensors 302) a deviation corresponding to the traverse of each vehicle of the plurality of vehicles relative to the initial baseline route. The infrastructure system is further configured to generate the developed baseline route based on the observed deviation. In one or more examples, a number of vehicles used to generate the developed baseline route may be based on the observed deviation corresponding to the traverse of each vehicle of the plurality of vehicles relative to the initial baseline route. As another example, the generation of the developed baseline route may also be based on a location of each observed deviation corresponding to the traverse of each vehicle of the plurality of vehicles relative to the initial baseline route. As yet another example, the generation of the developed baseline route may further be based on one or more configurations respectively associated with each vehicle of the plurality of vehicles.

At operation 404, the infrastructure system is also configured to transmit one or more commands instructing each vehicle of the plurality of vehicles to traverse the marshaling environment. In one or more examples, the one or more commands instructing each vehicle of the plurality of vehicles to traverse the marshaling environment are based on the chosen route. As another example, the one or more commands can include, but is not limited to, a stored curvature minimum value, a stored ideal curvature value, and a stored curvature maximum value (e.g., collectively referred to as one or more curvature values 310*a* and 310*b* as illustrated in FIGS. 3A and 3B). As yet another example, the stored ideal curvature value represents a middle of the chosen route while the stored curvature minimum value and the stored curvature maximum value represent a lower and upper limit of the chosen route, respectively.

At operation 406, the infrastructure system is further configured to determine whether the traverse of each vehicle of the plurality of vehicles exceeds the tolerance-related threshold. In one or more examples, the tolerance-related threshold is associated with the chosen route. As another example, the tolerance-related threshold corresponds to a frequency of an occurrence of a tolerance-related event. As yet another example, the tolerance-related event corresponds to one or more deviations including a distance of a vehicle of the plurality of vehicles from the chosen route, a radius of a turn associated with the vehicle of the plurality of vehicles from the chosen route, a speed of the vehicle of the plurality of vehicles relative to a path setting associated with the chosen route, or a combination thereof. As a further example, the determination of whether the traverse of each vehicle of the plurality of vehicles exceeds a tolerance-related threshold includes a determination of whether the frequency of the occurrence of the tolerance-related event at a location along the chosen route exceeds the tolerance-related threshold. It is understood that the infrastructure system is configured to verify (e.g., at any frequency) that the traverse of each vehicle of the plurality of vehicles matches the chosen route and that the chosen route is being traversed without exceeding the tolerance-related threshold.

In one or more examples, the one or more curvature values 310*a* illustrated in FIG. 3A represent an instance wherein the traverse of a vehicle of the plurality of vehicles exceeds the tolerance-related threshold. Specifically, the one or more curvature values 310*a* illustrated in FIG. 3A represent an instance wherein a received curvature minimum value, a received ideal curvature value, and a received curvature maximum value do not correspond with the stored curvature minimum value, the stored ideal curvature value, or the stored curvature maximum value, respectively.

In one or more examples, the one or more curvature values 310*b* illustrated in FIG. 3B represent an instance wherein the traverse of a vehicle of the plurality of vehicles does not exceed the tolerance-related threshold. Specifically, the one or more curvature values 310*b* illustrated in FIG. 3B represent an instance wherein a received curvature minimum value, a received ideal curvature value, and a received curvature maximum value correspond with the stored curvature minimum value, the stored ideal curvature value, and the stored curvature maximum value, respectively.

In one or more embodiments, the infrastructure system is configured to monitor the traverse of each vehicle of the plurality of vehicles across the marshaling environment. In one or more examples, whether the traverse of each vehicle of the plurality of vehicles exceeds the tolerance-related threshold is determined in response to monitoring the traverse of each vehicle of the plurality of vehicles across the marshaling environment. As another example, the infrastructure system is also configured to restrict access to particular areas within the marshaling environment based on a historical performance of certain types of vehicles related to how accurately the certain types of vehicles may traverse the marshaling environment. For example, the certain types of vehicles may include vehicles of different models, different features, different types, among others.

In one or more embodiments, the infrastructure system is configured to determine whether the frequency of the occurrence of the tolerance-related event at the location along the chosen route meets or exceeds a maximum bound of the tolerance-related threshold (e.g., the stored curvature maximum value). The infrastructure system is also configured to initiate the dynamic path routing process for each vehicle of the plurality of vehicles. In one or more examples, the dynamic path routing process for each vehicle of the plurality of vehicles is initiated in response to determining that the frequency of the occurrence of the tolerance-related event at the location along the chosen route meets or exceeds the maximum bound of the tolerance-related threshold. In one or more examples, the infrastructure system is configured to determine whether there are any identifiable patterns and/or identifiable offsets within the tolerance-related event (s). As another example, the infrastructure system is also configured to adjust the one or more commands to incorporate each of the identifiable patterns and/or identifiable offsets to reduce the frequency of performing the dynamic path routing process. For example, the dynamic path routing process would not be performed in a case wherein each of the identifiable patterns and/or identifiable offsets are incorporated within the one or more commands and the traverse of any of the vehicles within the plurality of vehicles would otherwise exceed the tolerance-related threshold. As another example, the adjustment to the one or more commands can include a correction to the chosen route, an incorporation of one or more new factors into the chosen route, among others.

At operation 408, the infrastructure system is additionally configured to initiate the dynamic path routing process. In one or more examples, the dynamic path routing process is initiated in response to the determination that the traverse of at least one vehicle of the plurality of vehicles exceeds the tolerance-related threshold. As another example, the dynamic path routing process causes the at least one vehicle of the plurality of vehicles to return to the chosen route. In one or more examples, the dynamic path routing process can be initiated for various and/or continuous lengths of time. As another example, the dynamic path routing process can also be initiated in real-time (e.g., while the at least one vehicle is traversing the marshaling environment) or stopped and at a particular location within the marshaling environment. As yet another example, the duration and/or location associated with a performance of the dynamic path routing process can be based on a category of deviation related to the tolerance-related event that caused the at least one vehicle of the plurality of vehicles to exceed the tolerance-related threshold. As a further example, the category of deviation can include a distance of the at least one vehicle of the plurality of vehicles from the chosen route, a radius of a turn associated with the at least one vehicle of the plurality of vehicles from the chosen route, a speed of the at least one vehicle of the plurality of vehicles relative to a path setting associated with the chosen route, or a combination thereof. As an additional example, the category of deviation that may result in the dynamic path routing process being performed at a particular duration or a particular location can be predefined.

In one or more embodiments, the infrastructure system is configured to determine an acceptable deviation from the developed baseline route. However, it is understood that each vehicle of the plurality of vehicles is also configured to determine the acceptable deviation from the developed baseline route. In one or more examples, the acceptable deviation from the developed baseline route is determined based on one or more of an estimated deviation, an observed deviation, and an allowed deviation. As another example, each of the estimated deviation and the observed deviation correspond to the traverse of each vehicle of the plurality of vehicles relative to the developed baseline route. As yet another example, the allowed deviation corresponds to a predefined maximum distance each vehicle of the plurality of vehicles is allowed to be located relative to the developed baseline route. The infrastructure system is also configured to calculate an average deviation. In one or more examples, the average deviation is calculated based on the traverse of each vehicle of the plurality of vehicles that is within the acceptable deviation from the developed baseline route. As another example, the generation of the chosen route is based on calculating the average deviation.

In one or more embodiments, the infrastructure system is configured to determine one or more correction factors. In one or more examples, the one or more correction factors are determined based on one or more configurations of each vehicle of the plurality of vehicles and a drive surface associated with the chosen route. The infrastructure system is also configured to adjust the one or more commands. In one or more examples, the one or more commands are adjusted in response to determining the one or more correction factors. As another example, the one or more correction factors can include any learned offsets, one or more vehicle features, a drive surface, among others. As yet another example, the learned offsets can include any of the patterns and/or offsets identified by the infrastructure system. As a further example, the one or more vehicle features can include vehicle tires, a powertrain, a vehicle wheelbase, trackwidth configurations, among others. As an additional example, the drive surface can include a surface type, material on the surface (e.g., water, oil, etc.), among others. As another example, the adjustments to the one or more commands are specific to the one or more correction factors and can include steering angle, speed, directional point distances, among others. It is understood that the one or more adjustments can cause for one or more features and/or functionalities respective to each vehicle of the plurality of vehicles to recalibrate based on the one or more commands.

In one or more embodiments, the infrastructure system is configured to simulate movement of each vehicle of the plurality of vehicles within a small driving course so that the infrastructure system may identify (e.g., via the set of infrastructure sensors 302) any offsets and/or any tolerances. In one or more examples, the infrastructure system is also configured to preemptively calculate any consistent offset(s) and/or correction factors before transmitting the one or more commands to each vehicle of the plurality of vehicles to traverse the marshaling environment to reduce the frequency of performing the dynamic path routing process. As another example, the tolerances can be related to steering, floor surface, the way in which different tires affect drivability of each vehicle of the plurality of vehicles, among others. As yet another example, sampling for the potential offsets can be learned based on path curvature as well.

Figure 5:
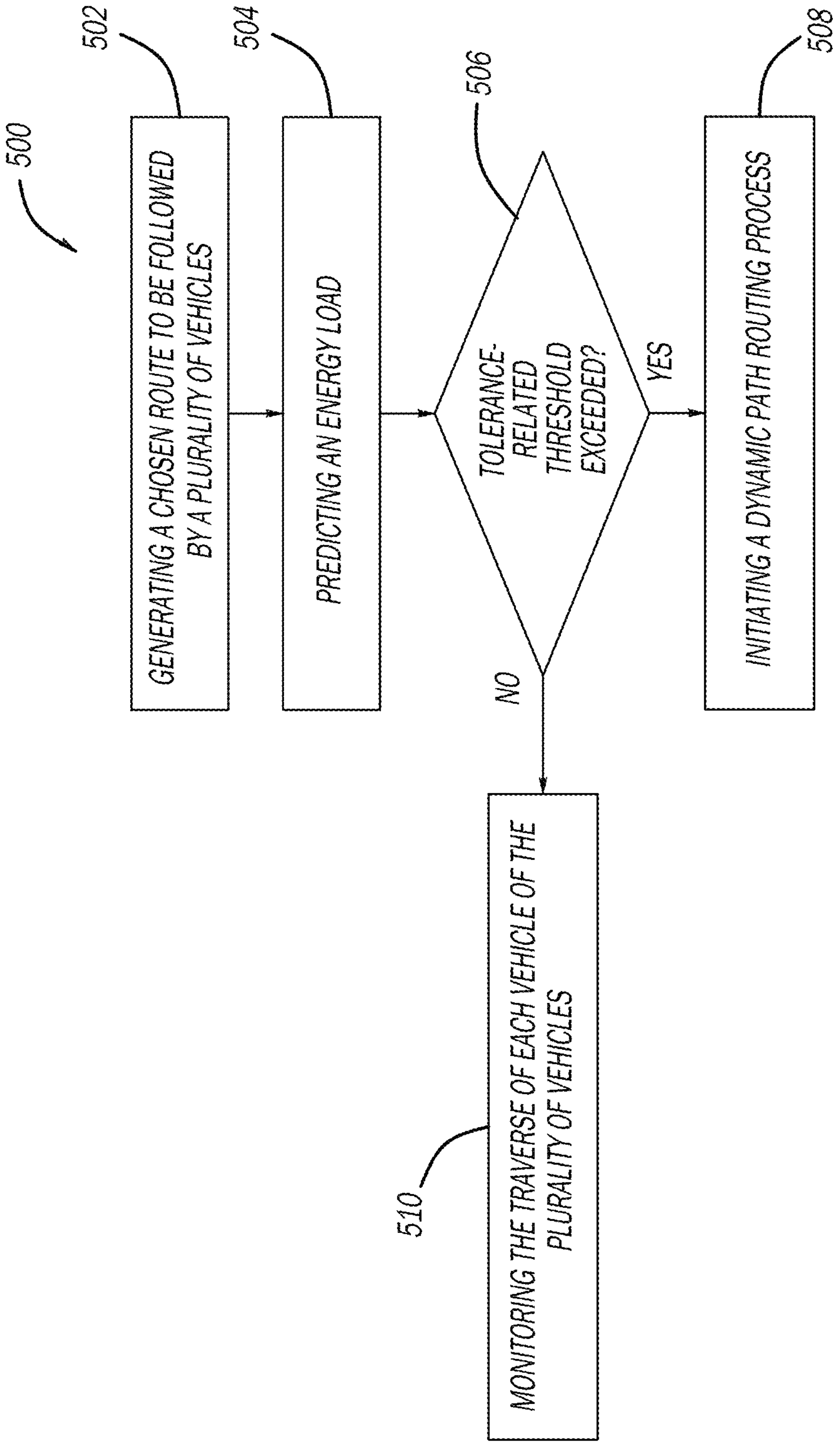
FIG. 5 is a flowchart illustrating another example method for minimizing dynamic path routing within a marshaling environment in accordance with one or more embodiments of the present disclosure.

FIG. 5 is a flowchart illustrating another example method 500 for minimizing dynamic path routing that is performed within a marshaling environment, as is described herein.

At operation 502, an infrastructure system (e.g., the infrastructure system 110) is configured to generate the chosen route to be followed by the plurality of vehicles. In one or more examples, the chosen route to be followed by the plurality of vehicles is generated based on a developed baseline route.

At operation 504, the infrastructure system is also configured to transmit one or more commands instructing each vehicle of the plurality of vehicles to traverse the marshaling environment. In one or more examples, the one or more commands instructing each vehicle of the plurality of vehicles to traverse the marshaling environment are based on the chosen route.

At operation 506, the infrastructure system is further configured to determine whether the traverse of each vehicle of the plurality of vehicles exceeds the tolerance-related threshold. In one or more examples, the tolerance-related threshold is associated with the chosen route. In an instance wherein the traverse of a vehicle of the plurality of vehicles is determined to have exceeded the tolerance-related threshold, the infrastructure system is additionally configured to initiate the dynamic path routing process at operation 508. In one or more examples, the dynamic path routing process causes the at least one vehicle of the plurality of vehicles to return to the chosen route.

However, in an instance wherein the traverse of a vehicle of the plurality of vehicles is determined to not have exceeded the tolerance-related threshold, the infrastructure system is configured to continue to monitor the traverse of each vehicle of the plurality of vehicles across the marshaling environment at operation 510.

Figure 6:
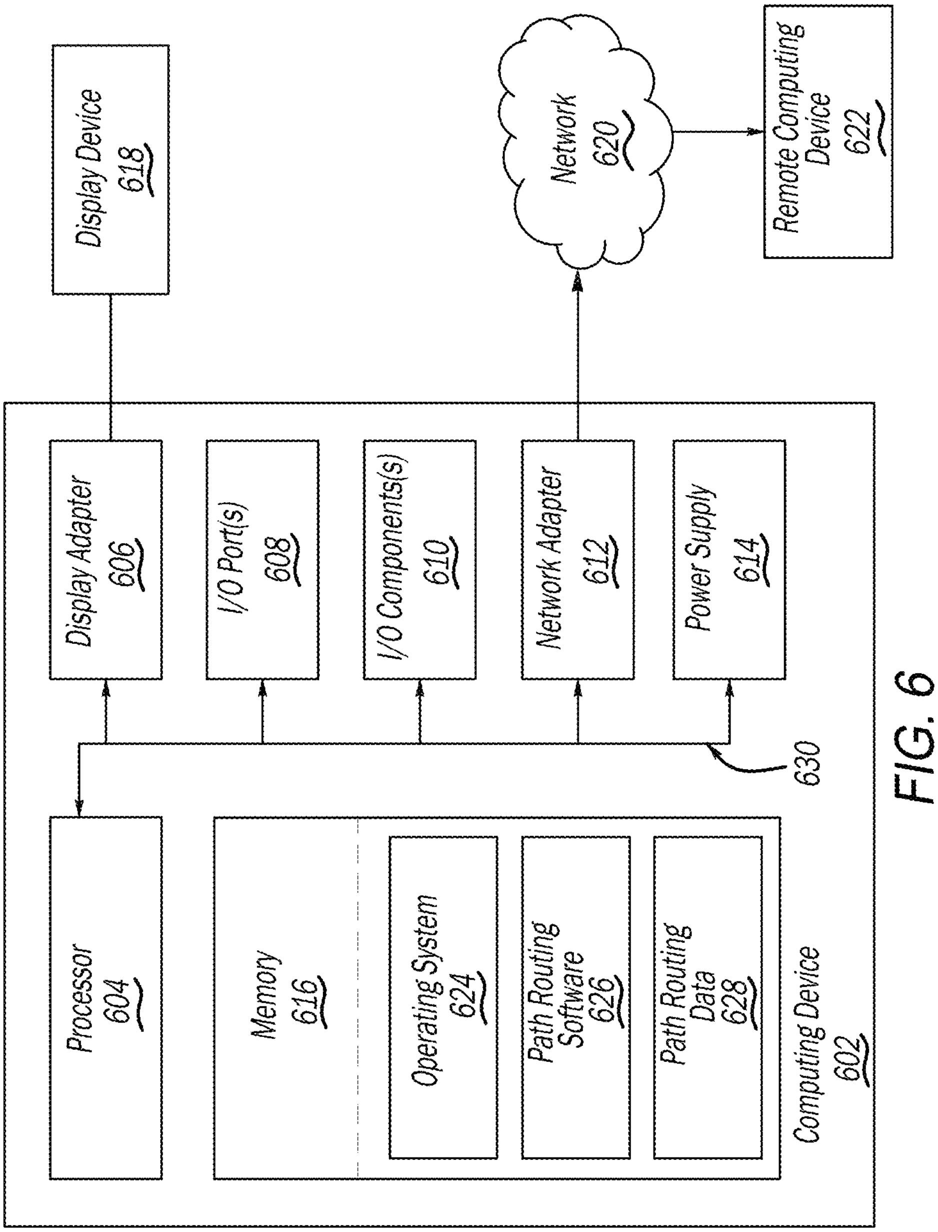
FIG. 6 is a block diagram illustrating an example computer system in accordance with one or more embodiments of the present disclosure.

FIG. 6 illustrates an operating environment, such as a computer system, that facilitates the performance of the one or more systems and methods described herein. More specifically, the systems and methods described herein can be implemented using a computing device 602. For example, the computing device 602 can be a personal computer, a desktop, a laptop, a tablet, a hand-held computer, a server, a workstation, a mainframe, a wearable computer, a supercomputer, or a combination thereof. However, it is understood that the aforementioned examples of the computing device 602 is non-exhaustive and the computing device 602 can be any type of processing or computing device. The computing device 602 generally includes a processor 604, a display adapter 606, one or more input/output port(s) 608, one or more input/output component(s) 610, a network adapter 612, a power supply 614, and a memory 616. However, it is understood that the computing device 602 can include any additional components therein and is not required to include any of the listed components (e.g., the processor 604, the display adapter 606, the one or more input/output port(s) 608, the one or more input/output component(s) 610, the network adapter 612, the power supply 614, and the memory 616).

The processor 604 is configured to provide instructions to the computing device 602 so that the computing device 602 can process one or more tasks including the implementation of a software program to perform one or more operations as described in more detail herein. It is also understood that the computing device 602 may include any number or processors 604 therein. The display adapter 606 can be a graphics card or a video board that provides the computing device 602 with a capability to display content on a display device 618. For example, the display device 618 can be any screen, monitor, and/or light-emitting component associated with any of the personal computer, the desktop, the laptop, the tablet, the hand-held computer, the server, the workstation, the mainframe, the wearable computer, the supercomputer, or a combination thereof. However, it is understood that the aforementioned examples of the display device 618 is non-exhaustive and that the display device 618 can be any type of device capable of providing a visual display.

The input/output port(s) 608 provide a number of interfaces (e.g., sockets) for one or more cables to connect to the computing device 602. It is understood that there may be any number of input/output port(s) 608 on the computing device 602. For example, the input/output port(s) 608 provides a means for the computing device 602 to receive signals and/or data from an external device connected to the computing device 602 via the one or more cables. As another example, the input/output port(s) 608 provide a means for the computing device 602 to send signals and/or data to an external device connected to the computing device 602 via the one or more cables. The input/output component(s) 610 can include one or more components that support the input/output port(s) 608 such as, but not limited to, a switch, a push button, a pressure mat, a float switch, a keypad, a radio receive, or a combination thereof.

The network adapter 612 can be any type of network interface controller that is configured to provide a means for communicating over a network 620 with another computing device, such as a remote computing device 622. For example, the remote computing device 622 can be a user device such as a cellular-phone, a smartphone, a tablet, a laptop, or a combination thereof. The power supply 614 is configured to convert alternating high voltage current (e.g., AC) into direct current (e.g., DC) to provide power to the other components (e.g., the processor 604, the display adapter 606, the one or more input/output port(s) 608, the one or more input/output component(s) 610, the network adapter 612, and the memory 616) of the computing device 602.

Additionally, the memory 616 can be a mass storage device and/or a system memory such as a hard disk drive, a memory card, a solid-state drive, random access memory (RAM), or a combination thereof. The memory 616 is configured to provide storage for instructions and data associated with the operation of the computing device 602. The memory 616 can generally include an operating system 624, path routing software 626, and path routing data 628. For example, the operating system 624 is configured to manage and/or process any of the data and/or instructions associated with the path routing software 626 and/or path routing data 628, as described in more detail herein, such as to route a plurality of vehicles along the same, or a similar, path through a marshaling environment.

Furthermore, a system bus 630 is also included within the computing device 602 that is configured to couple each of the various components (e.g., the processor 604, the display adapter 606, the one or more input/output port(s) 608, the one or more input/output component(s) 610, the network adapter 612, the power supply 614, and the memory 616) of the computing device 602. It is also understood that each of the components of the computing device 602, and the functionality associated with each of the components of the computing device 602, may be implemented within the remote computing device 622. While the operating environment illustrated within FIG. 6 depicts a particular configuration associated with at least the computing device 602, the network 620, and the remote computing device 622, it is understood that the operating environment may be configured in any way.

Thus, one or more examples of the present disclosure provide a means for minimizing dynamic path routing that is performed within a marshaling environment by generally providing each vehicle of a plurality of vehicles with the same, or similar, path to follow as each vehicle of the plurality of vehicles progress through the marshaling environment. The present disclosure also provides a means for individually and dynamically adjusting the progression of any vehicle of the plurality of vehicles that exceed a tolerance-related threshold.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:

generating a chosen route to be followed by a plurality of vehicles based on a developed baseline route;

transmitting one or more commands instructing each vehicle of the plurality of vehicles to traverse a marshaling environment based on the chosen route;

determining whether the traverse of each vehicle of the plurality of vehicles exceeds a tolerance-related threshold associated with the chosen route; and initiating a dynamic path routing process in response to determining that a traverse of a vehicle of the plurality of vehicles exceeds the tolerance-related threshold, wherein the dynamic path routing process causes the vehicle of the plurality of vehicles to return to the chosen route.

2. The method of claim 1, further comprising:

receiving an initial baseline route from at least one vehicle of the plurality of vehicles or an operator associated with the marshaling environment;

observing a deviation corresponding to the traverse of each vehicle of the plurality of vehicles relative to the initial baseline route; and generating the developed baseline route based on the observed deviation.

3. The method of claim 1, further comprising:

determining an acceptable deviation from the developed baseline route based on one or more of an estimated deviation, an observed deviation, and an allowed deviation, wherein each of the estimated deviation and the observed deviation correspond to the traverse of each vehicle of the plurality of vehicles relative to the developed baseline route, and wherein the allowed deviation corresponds to a predefined maximum distance each vehicle of the plurality of vehicles is allowed to be located relative to the developed baseline route; and calculating an average deviation based on the traverse of each vehicle of the plurality of vehicles that is within the acceptable deviation from the developed baseline route, wherein generating the chosen route is based on calculating the average deviation.

4. The method of claim 1, further comprising:

monitoring the traverse of each vehicle of the plurality of vehicles across the marshaling environment, wherein whether the traverse of each vehicle of the plurality of vehicles exceeds the tolerance-related threshold is determined in response to monitoring the traverse of each vehicle of the plurality of vehicles across the marshaling environment.

5. The method of claim 1, wherein the tolerance-related threshold corresponds to a frequency of an occurrence of a tolerance-related event, and wherein determining whether the traverse of each vehicle of the plurality of vehicles exceeds the tolerance-related threshold comprises:

determining whether the frequency of the occurrence of the tolerance-related event at a location along the chosen route exceeds the tolerance-related threshold, wherein the tolerance-related event corresponds to one or more deviations including a distance of a vehicle of the plurality of vehicles from the chosen route, a radius of a turn associated with the vehicle of the plurality of vehicles from the chosen route, a speed of the vehicle of the plurality of vehicles relative to a path setting associated with the chosen route, or a combination thereof.

6. The method of claim 5, further comprising:

determining whether the frequency of the occurrence of the tolerance-related event at the location along the chosen route meets or exceeds a maximum bound of the tolerance-related threshold; and initiating the dynamic path routing process for each vehicle of the plurality of vehicles in response to determining that the frequency of the occurrence of the tolerance-related event at the location along the chosen route meets or exceeds the maximum bound of the tolerance-related threshold.

7. The method of claim 1, further comprising:

determining one or more correction factors based on one or more configurations of each vehicle of the plurality of vehicles and a drive surface associated with the chosen route; and adjusting the one or more commands in response to determining the one or more correction factors.

8. A system comprising:

an infrastructure system configured to:

generate a chosen route to be followed by a plurality of vehicles based on a developed baseline route, transmit one or more commands instructing each vehicle of the plurality of vehicles to traverse a marshaling environment based on the chosen route, determine whether the traverse of each vehicle of the plurality of vehicles exceeds a tolerance-related threshold associated with the chosen route, and initiate a dynamic path routing process in response to determining that a traverse of a vehicle of the plurality of vehicles exceeds the tolerance-related threshold; and the vehicle of the plurality of vehicles configured to:

receive the one or more commands, and return to the chosen route in response to the initiation of the dynamic path routing process.

9. The system of claim 8, wherein the infrastructure system is further configured to:

receive an initial baseline route from at least one vehicle of the plurality of vehicles or an operator associated with the marshaling environment;

observe a deviation corresponding to the traverse of each vehicle of the plurality of vehicles relative to the initial baseline route; and generate the developed baseline route based on the observed deviation.

10. The system of claim 8, wherein the infrastructure system is further configured to:

determine an acceptable deviation from the developed baseline route based on one or more of an estimated deviation, an observed deviation, and an allowed deviation, wherein each of the estimated deviation and the observed deviation correspond to the traverse of each vehicle of the plurality of vehicles relative to the developed baseline route, and wherein the allowed deviation corresponds to a predefined maximum distance each vehicle of the plurality of vehicles is allowed to be located relative to the developed baseline route; and calculate an average deviation based on the traverse of each vehicle of the plurality of vehicles that is within the acceptable deviation from the developed baseline route, wherein generating the chosen route is based on calculating the average deviation.

11. The system of claim 8, wherein the infrastructure system is further configured to:

monitor the traverse of each vehicle of the plurality of vehicles across the marshaling environment, wherein whether the traverse of each vehicle of the plurality of vehicles exceeds the tolerance-related threshold is determined in response to monitoring the traverse of each vehicle of the plurality of vehicles across the marshaling environment.

12. The system of claim 8, wherein the tolerance-related threshold corresponds to a frequency of an occurrence of a tolerance-related event, and wherein the infrastructure system configured to determine whether the traverse of each vehicle of the plurality of vehicles exceeds the tolerance-related threshold is further configured to:

determine whether the frequency of the occurrence of the tolerance-related event at a location along the chosen route exceeds the tolerance-related threshold, wherein the tolerance-related event corresponds to one or more deviations including a distance of a vehicle of the plurality of vehicles from the chosen route, a radius of a turn associated with the vehicle of the plurality of vehicles from the chosen route, a speed of the vehicle of the plurality of vehicles relative to a path setting associated with the chosen route, or a combination thereof.

13. The system of claim 12, wherein the infrastructure system is further configured to:

determine whether the frequency of the occurrence of the tolerance-related event at the location along the chosen route meets or exceeds a maximum bound of the tolerance-related threshold; and initiate the dynamic path routing process for each vehicle of the plurality of vehicles in response to determining that the frequency of the occurrence of the tolerance-related event at the location along the chosen route meets or exceeds the maximum bound of the tolerance-related threshold.

14. The system of claim 8, wherein the infrastructure system is further configured to:

determine one or more correction factors based on one or more configurations of each vehicle of the plurality of vehicles and a drive surface associated with the chosen route; and adjust the one or more commands in response to determining the one or more correction factors.

15. One or more non-transitory computer-readable media storing processor-executable instructions that, when executed by at least one processor, cause the at least one processor to:

generate a chosen route to be followed by a plurality of vehicles based on a developed baseline route;

transmit one or more commands instructing each vehicle of the plurality of vehicles to traverse a marshaling environment based on the chosen route;

determine whether the traverse of each vehicle of the plurality of vehicles exceeds a tolerance-related threshold associated with the chosen route; and initiate a dynamic path routing process in response to determining that a traverse of a vehicle of the plurality of vehicles exceeds the tolerance-related threshold, wherein the dynamic path routing process causes the vehicle of the plurality of vehicles to return to the chosen route.

16. The one or more non-transitory computer-readable media of claim 15, wherein the at least one processor is further caused to:

receive an initial baseline route from at least one vehicle of the plurality of vehicles or an operator associated with the marshaling environment;

observe a deviation corresponding to the traverse of each vehicle of the plurality of vehicles relative to the initial baseline route; and generate the developed baseline route based on the observed deviation.

17. The one or more non-transitory computer-readable media of claim 15, wherein the at least one processor is further caused to:

determine an acceptable deviation from the developed baseline route based on one or more of an estimated deviation, an observed deviation, and an allowed deviation, wherein each of the estimated deviation and the observed deviation correspond to the traverse of each vehicle of the plurality of vehicles relative to the developed baseline route, and wherein the allowed deviation corresponds to a predefined maximum distance each vehicle of the plurality of vehicles is allowed to be located relative to the developed baseline route; and calculate an average deviation based on the traverse of each vehicle of the plurality of vehicles that is within the acceptable deviation from the developed baseline route, wherein generating the chosen route is based on calculating the average deviation.

18. The one or more non-transitory computer-readable media of claim 15, wherein the tolerance-related threshold corresponds to a frequency of an occurrence of a tolerance-related event, and wherein the at least one processor caused to determine whether the traverse of each vehicle of the plurality of vehicles exceeds the tolerance-related threshold is further caused to:

determine whether the frequency of the occurrence of the tolerance-related event at a location along the chosen route exceeds the tolerance-related threshold, wherein the tolerance-related event corresponds to one or more deviations including a distance of a vehicle of the plurality of vehicles from the chosen route, a radius of a turn associated with the vehicle of the plurality of vehicles from the chosen route, a speed of the vehicle of the plurality of vehicles relative to a path setting associated with the chosen route, or a combination thereof.

19. The one or more non-transitory computer-readable media of claim 18, wherein the at least one processor is further caused to:

determine whether the frequency of the occurrence of the tolerance-related event at the location along the chosen route meets or exceeds a maximum bound of the tolerance-related threshold; and initiate the dynamic path routing process for each vehicle of the plurality of vehicles in response to determining that the frequency of the occurrence of the tolerance-related event at the location along the chosen route meets or exceeds the maximum bound of the tolerance-related threshold.

20. The one or more non-transitory computer-readable media of claim 15, wherein the at least one processor is further caused to:

determine one or more correction factors based on one or more configurations of each vehicle of the plurality of vehicles and a drive surface associated with the chosen route; and adjust the one or more commands in response to determining the one or more correction factors.

* * * * *